Oct. 15, 1957 G. L. KNITTLE 2,810,016

KEY TELEPHONE SET HOLDING CIRCUIT

Filed Dec. 27, 1955

INVENTOR
G. L. KNITTLE
BY John E. Cassidy
ATTORNEY 2,810,016

KEY TELEPHONE SET HOLDING CIRCUIT

Gale L. Knittle, Western Springs, Ill., assignor to American Telephone and Telegraph Company, a corporation of New York Application December 27, 1955, Serial No. 555,382

6 Claims. (Cl. 179—1)

Figure 1:
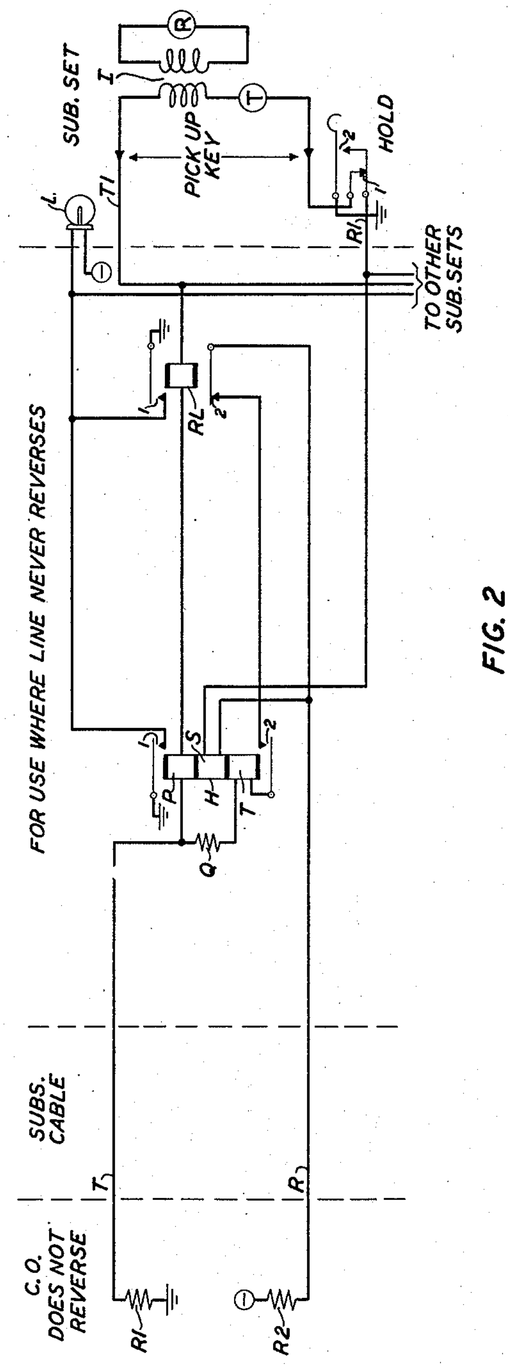

This invention is an improved key telephone circuit for use in key telephone systems. Key telephone systems are employed on telephone subscriber's premises, such as business offices, and generally comprise a number of subscriber stations and a number of telephone lines extending to a central telephone station, and may include lines to private branch exchanges or to other installations. Key telephone installations vary in size from one which may have two or three subscriber stations on the premises and one or two lines to a central station, for instance, to others which may have forty or more subscriber stations on the premises and twenty or more lines to central stations and other installations.

Formerly such service was handled almost entirely by private branch exchanges, as they are called, which comprised usually one telephone switchboard position at which a telephone operator was in attendance. All of the local stations on the premises were terminated at the switchboard position as were all lines from the central telephone station and other remote installations. The operator on the premises answered all calls and performed whatever switching functions were required.

Key telephone systems are designed in such manner as to eliminate the need of an attendant on the local premises. Telephone lines from the central office and other remote installations after passing through the relay control equipment on the local premises are extended directly to some subscriber station and then are connected in parallel to other stations, as desired. The lines are provided with signals so that a party at any subscriber station is informed of the condition of the line, that is whether it is available for use, in use, or being held, by a condition of the signals.

When a subscriber station is connected to a central telephone office, and generally when connected to a private branch exchange, a single pair of wires is employed for the connection. The circuits are arranged so that talking and signaling are carried on between the subscriber station and the remote station over but two wires.

As distinguished from this, in modern key telephone systems, affording the supervisory features which are presently generally required to be provided, additional conductors are needed to interconnect the stations in parallel and to connect the stations to the relay equipment on the subscriber premises. In one well-known system, a total of five conductors are required in making each such connection. In the case of a small key telephone system having but a few stations and lines, since the additional wiring required is all local to the premises, the additional conductors needed are of small consequence economically. However, in the larger installations hundreds of feet of cable are at times required and the elimination of one or more conductors would represent a substantial saving.

The present invention reduces the cost of key telephone systems by eliminating two of the five conductors widely employed in modern key telephone systems while all functions formerly afforded by the five-conductor connection are provided in the present three-conductor circuit.

The invention may be understood from the following description when read with reference to the associated drawings which taken together disclose preferred embodiments in which the invention is presently incorporated. It is to be understood, however, that the invention may be incorporated in other embodiments which may be suggested to those skilled in the art by the present disclosure.

Figure 2:
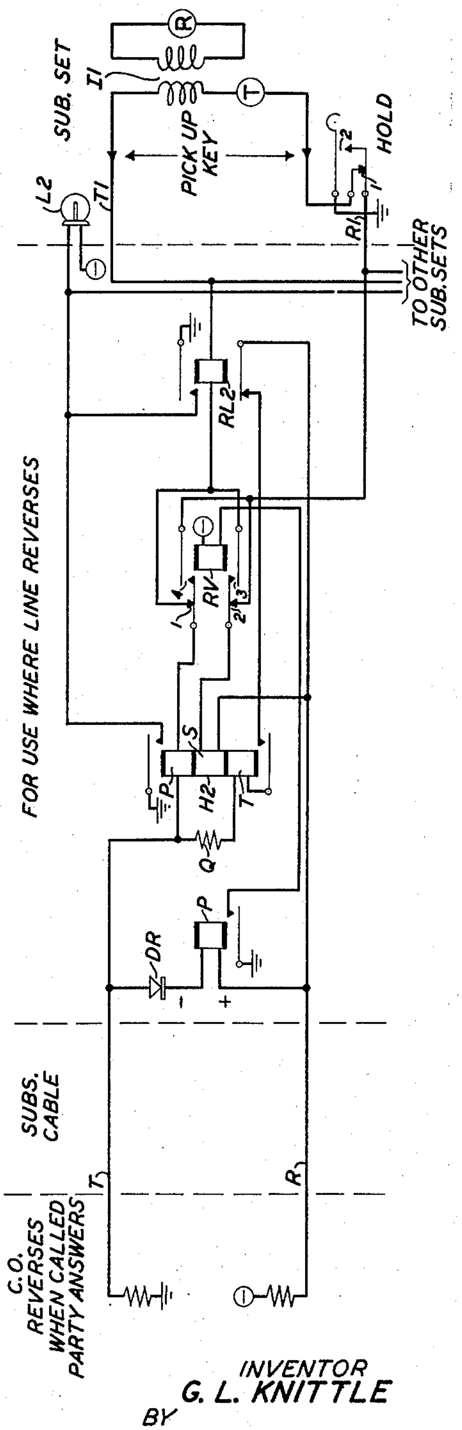

In the drawings:

Fig. 1 shows a key telephone line circuit for use with a central station in which the terminating battery and ground connections to the tip and ring conductors are never reversed; and Fig. 2 shows a key telephone line circuit for use with a central office in which the battery and ground terminations to the tip and ring conductors are reversed for different conditions.

Refer now to Fig. 1. When the circuit is idle the tip conductor T is terminated through a resistor R1 in ground at the central station and the ring conductor is terminated through a resistor R2 in grounded negative battery at the central station. When the circuit is idle, the tip conductor T1 and the ring conductor R1 are open at the contacts of a pick-up key in the subscriber's set indicated by the arrowheads in the right-hand portion of the drawing. When a patron wishes to use the circuit, he closes the pick-up key. A circuit may then be traced from ground at the central station through resistor R1, conductor T, winding P of relay H, winding of relay RL, conductor T1, upper contact of the pick-up key, left-hand winding of inductance I, transmitter T, lower contact of the pick-up key, contact 1 of the hold key, winding S of relay H, ring conductor R and resistor R2 to grounded battery. The effects of the current flowing in primary winding P and in secondary winding S of relay H are equal in magnitude and the effects are opposed, so that relay H remains unoperated. Relay RL operates. The closing of contact 1 of relay RL establishes a circuit from ground through contact 1 of relay RL and the filament of lamp L to battery, lighting the lamp as an indication that the circuit is in operation. Examples of cooperating relay circuits associated with the line at the central station are shown in Patents 1,965,383, granted to C. C. Lane, July 3, 1934, 2,222,672, granted to W. V. K. Large, November 26, 1940, and 2,360,040, granted to C. A. Dahlbom, October 10, 1944, which are hereby incorporated herein by reference as though fully set forth herein.

When the patron wishes to hold the line, he operates the hold key. This opens contact 1 and thereby opens the path between the tip conductor T1 and the ring conductor R1 through the subscriber's set. The operation of the hold key also releases relay RL. The operation of the hold key further deenergizes the primary winding P of relay H. The operation of the hold key also establishes a circuit from ground through contact 2 of the hold key, secondary winding S of relay H, conductor R and resistor R2 to grounded battery, energizing the secondary winding S of relay H. Since the primary winding P of relay H is deenergized, the effect of the energization of the secondary winding S of relay H is unopposed, relay H is therefore operated and its contacts 1 and 2 are closed. The closing of contact 1 establishes a circuit from ground through contact 1 of relay H and the filament of lamp L to battery, maintaining lamp L lighted as an indication that the circuit is being held. It is to be understood that the conditions applied through contact 1 of relay RL and contact 1 of relay H to the lamp L, need not be direct ground, as indicated, but may be interrupted ground in one or both cases, and if in both cases at different rates to provide distinguishable flashing conditions of lamp L to connote the two different conditions. The operation of relay H provides a locking path for the relay which may be traced from ground at the central station through resistor R1, conductor T, resistor Q, tertiary winding T of relay H, contact 2 of relay H, contact 2 of relay RL, conductor R and resistor R2 to grounded battery at the central station. Reconnection of the subset circuit to conductors T1 and R1 will reenergize relay RL. The opening of contact 2 of relay RL will open the locking path of relay H permitting the relay to release.

Attention is particularly called to the fact that, in the circuit of Fig. 1, there are but three conductors, the lamp conductor, the tip conductor T1 and the ring conductor R1, connecting the subscriber's set to the line relay equipment on the premises. Further there are but three conductors required for parallel connection to the other subscriber's sets. In other presently known circuits affording the features described, two additional conductors have heretofore been required for those connections. This is an important aspect of the present invention. With respect to the parallel connections, it is to be understood that a line circuit per Fig. 1 is at times connected in parallel to as many as ten or even twenty subscriber positions.

Refer now to Fig. 2. The circuit of Fig. 2 differs from the circuit of Fig. 1 in that in Fig. 1 the tip and ring conductors T and R are terminated in ground and grounded battery, respectively, and these battery and ground connections at the central office remain unchanged. Contrasted with this in the circuit of Fig. 2 the battery and ground connections at the central office are reversed for different signaling conditions. The circuit of Fig. 2 has a relay H2 and a relay RL2 which correspond with relay H and relay RL of Fig. 1, respectively, and operate in the same manner as described for relays H and RL in the foregoing. In addition, Fig. 2 has two other relays, relay P and relay RV. The winding of relay P is connected across the line between the tip conductor T and the ring conductor R. In series with the winding of the relay P is a diode rectifier DR. This rectifier will prevent current from flowing through the winding of relay P except when the battery conditions at the central office are reversed from the normal condition shown. At such time, relay P will operate. The closure of the contact of relay P supplies current through the winding of relay RV to battery. Normally, as described in Fig. 1, the tip conductor after passing through the primary winding P of relay H connects through the winding of relay RL then to tip conductor T1 of the subscriber set and the ring conductor R1 of the subscriber set is connected directly to the secondary winding S of relay H. In Fig. 2, when relay RV is normal, the tip conductor T1 and the ring conductor R1 of Fig. 2 are connected to the primary winding P and the secondary winding S of relay H in the same manner as described for Fig. 1 in the foregoing. When relay RV is operated, these connections are reversed. The tip conductor T1 normally connects through contact 1 of relay RV and the ring conductor R1 normally connects through contact 2 of relay RV to the primary winding P and the secondary winding S of relay H, respectively. When relay RV is operated, the tip conductor T1 is connected through contact 4 to the secondary winding S and the primary winding P of relay H2, respectively. The reason for this reversal is to insure that the hold key which supplies ground through a single winding of relay H2 to battery at the central station will always be connected to the side of the line to which battery is connected.

What is claimed is:

1. In a telephone system, a key telephone line circuit having a holding relay and a line lamp relay, a circuit extending through a first winding on said holding relay, a winding on said line lamp relay, a subscriber telephone circuit, normally closed contacts of a holding key and a second winding on said holding relay, all in series, the magnetic effects of the current in said first and second windings of said holding relay being normally opposed.

2. A system in accordance with claim 1, and means responsive to the operation of said hold key for actuating said holding relay.

3. A system in accordance with claim 1, another locking winding on said holding relay and means responsive to the operation of said hold key for locking said holding relay through said locking winding.

4. A system in accordance with claim 1, a locking winding on said holding relay, means responsive to the operation of said hold key for locking said holding relay through said locking winding, said means comprising a contact on said line lamp relay.

5. A system in accordance with claim 1, said holding relay having a locking winding thereon, means responsive to the release of said line lamp relay and the operation of said hold key for locking said holding relay through said locking winding, and means responsive thereafter to the operation of said line lamp relay for releasing said holding relay.

6. In a telephone system, a communication and signaling path having a tip and a ring conductor extending from a remote telephone office to a subscriber's premises, then through individual windings on a holding relay in a key telephone circuit, one of said conductors extending in series through a line signaling relay and a subscriber set circuit and through contacts of a hold key to the other of said conductors, means responsive to the actuation of said hold key for actuating said holding relay and releasing said line signaling relay, means responsive to the actuation of said holding relay and the release of said line signaling relay for locking said holding relay and means responsive to the closing of a path through said pair on said premises for actuating said line signaling relay and releasing said holding relay.

References Cited in the file of this patent

UNITED STATES PATENTS

| | | |
|---|---|---|
| 2,065,883 | Beaumont | Dec. 29, 1936 |
| 2,128,411 | Halligan | Aug. 30, 1938 |
| 2,273,530 | King | Feb. 17, 1942 |